United States Patent
Dietl et al.

(10) Patent No.: US 12,305,110 B2
(45) Date of Patent: May 20, 2025

(54) ANTIFREEZE AGENTS AND COOLANTS FOR FUEL CELLS, STORAGE BATTERIES AND BATTERIES

(71) Applicant: BASF SE, Ludwigshafen am Rhein (DE)

(72) Inventors: Harald Dietl, Ludwigshafen (DE); Bayram Aydin, Ludwigshafen (DE); Roger Sieg, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 979 days.

(21) Appl. No.: 17/288,991

(22) PCT Filed: Oct. 25, 2019

(86) PCT No.: PCT/EP2019/079236
§ 371 (c)(1),
(2) Date: Apr. 27, 2021

(87) PCT Pub. No.: WO2020/094427
PCT Pub. Date: May 14, 2020

(65) Prior Publication Data
US 2021/0403782 A1    Dec. 30, 2021

(30) Foreign Application Priority Data

Nov. 6, 2018 (EP) .................... 18204600
Feb. 12, 2019 (EP) .................... 19156712
Feb. 12, 2019 (EP) .................... 19156713

(51) Int. Cl.
| | |
|---|---|
| C09K 5/10 | (2006.01) |
| C09K 5/20 | (2006.01) |
| H01M 8/04029 | (2016.01) |
| H01M 10/0525 | (2010.01) |
| H01M 10/0568 | (2010.01) |
| H01M 10/0569 | (2010.01) |
| H01M 10/613 | (2014.01) |
| H01M 10/6567 | (2014.01) |

(52) U.S. Cl.
CPC .................. *C09K 5/10* (2013.01); *C09K 5/20* (2013.01); *H01M 8/04029* (2013.01); *H01M 10/613* (2015.04); *H01M 10/6567* (2015.04); *H01M 10/0525* (2013.01); *H01M 10/0568* (2013.01); *H01M 10/0569* (2013.01); *H01M 2300/0028* (2013.01)

(58) Field of Classification Search
CPC ....................................................... C09K 5/20
See application file for complete search history.

(56) References Cited

U.S. PATENT DOCUMENTS

| | | |
|---|---|---|
| 3,849,433 A | 11/1974 | Butula |
| 7,201,982 B2 | 4/2007 | Maes et al. |
| 7,419,618 B2 | 9/2008 | Wenderoth et al. |
| 8,394,287 B2 | 3/2013 | Evans et al. |
| 2005/0109979 A1 | 5/2005 | Egawa et al. |
| 2015/0266370 A1 | 9/2015 | Fuerstner |
| 2019/0352553 A1 | 11/2019 | Dietl et al. |

FOREIGN PATENT DOCUMENTS

| | | | |
|---|---|---|---|
| DE | 1948794 A1 | 4/1971 | |
| EP | 1399523 B1 | 11/2004 | |
| KR | 20050036836 A | 4/2005 | |
| WO | WO-95/07323 A1 | 3/1995 | |
| WO | WO-03/074626 A1 | 9/2003 | |
| WO | WO-2013160101 A1 * | 10/2013 | ............. C09K 15/22 |
| WO | WO-2018/095759 A1 | 5/2018 | |

OTHER PUBLICATIONS

Brinck et al. English machine translation of WO/03074626A1. (Year: 2003).*
European Search Report for EP Patent Application No. 18204600.3, Issued on Apr. 16, 2019, 3 pages.
International Search Report for PCT Patent Application No. PCT/EP2019/079236, Issued on Jan. 7, 2020, 3 pages.
Plakhotnyk, et al., "Hydrolysis in the system LiPF6-propylene carbonate-dimethyl carbonate-H2O", Journal of Fluorine Chemistry, vol. 126, Issue 1, Jan. 2005, pp. 27-31.

* cited by examiner

*Primary Examiner* — Peter F Godenschwager
(74) *Attorney, Agent, or Firm* — Grüneberg and Myers PLLC

(57) ABSTRACT

Substantially water-free antifreezes for cooling systems can be used as coolants and antifreezes without further dilution with water.

17 Claims, No Drawings

ANTIFREEZE AGENTS AND COOLANTS FOR FUEL CELLS, STORAGE BATTERIES AND BATTERIES

CROSS-REFERENCE TO RELATED APPLICATIONS

This application is the National Stage entry under § 371 of International Application No. PCT/EP2019/079236, filed on Oct. 25, 2019, and which claims the benefit of priority to European Application No. 18204600.3, filed on Nov. 6, 2018; European Application No. 19156713.0, filed on Feb. 12, 2019; and European Application No. 19156712.2, filed on Feb. 12, 2019. The content of each of these applications is hereby incorporated by reference in its entirety.

BACKGROUND OF THE INVENTION

Field of the Invention

The present invention relates to novel, substantially water-free, antifreezes for cooling systems which are employable as such, i.e. without further dilution with water, as coolants and antifreezes and to the use thereof in cooling systems in electric vehicles having fuel cells and/or batteries and/or in hybrid vehicles composed of electric vehicles having fuel cells and/or batteries with internal combustion engines, preferably in motor vehicles, particularly preferably in passenger and commercial vehicles (so-called light- and heavy-duty vehicles).

Description of Related Art

Fuel cells and/or batteries for mobile use, particularly in motor vehicles, must be operable even at low external temperatures of down to about minus 40° C. A frost-protected coolant circuit is therefore indispensable.

Furthermore, temperatures of up to above 100° C. are reached during rapid charging of batteries and so the heat must be removed in order not to damage the particular component.

The use of conventional antifreezes employed in internal combustion engines and based on monoalkylene glycols optionally in conjunction with glycerol would not be possible in fuel cells and/or batteries without complete electrical insulation of the coolant channels, since these antifreezes have an excessive electrical conductivity which would adversely affect the function of the fuel-cell or battery on account of the salts and ionizable compounds present therein as corrosion inhibitors. Furthermore, in the event of an accident with battery leakage there is a risk of short circuit due to shorting of anode and cathode with the cooling liquid and/or evolution of hydrogen gas by electrolysis which carries additional risk potential.

Water- and ethylene glycol-containing coolants having a low conductivity are known for this purpose (see for example US 2015/266370).

WO 95/07323 discloses water-free coolants having a water content below 0.5 wt % based on propylene glycol and optionally ethylene glycol but only for internal combustion engines. Usage for cooling of electrical components is not proposed.

It is also necessary for the antifreezes to maintain their usually initially low electrical conductivity over a long period of time and not increase in conductivity due to different decomposition processes, usually to form ions.

EP 1399523 discloses coolants for fuel cells based on water/monoethylene glycol which comprise azole derivatives and optionally orthosilicate esters as inhibitors.

Water as a substantial constituent in conventional antifreeze liquids causes the usage temperature of these antifreeze liquids to be limited to the boiling temperature of water in the respective mixtures at atmospheric pressure. Accordingly, mixtures of water and monoethylene glycol as a typical customary antifreeze liquid generally boil at about 110° C. to 120° C. at standard pressure.

Water-free coolant concentrates, in which an antifreeze component, usually monoethylene glycol, is mixed with various additives, for example corrosion inhibitors, antioxidants, antifoams, bitterants and dyes, are widely described in the prior art, for example in U.S. Pat. No. 8,394,287. U.S. Pat. No. 8,394,287 additionally describes the presence of at least one further antifreeze component, for example monopropylene glycol or higher ethylene glycol homologues of glycerol, in the concentrate.

The purpose of these coolant concentrates is always later dilution with water for use as a coolant (usually with a water content of 30 to 70 vol %); the use of the undiluted concentrates as coolant is not intended.

Often also described are so-called superconcentrates which are essentially highly concentrated formulations of the above additives in relatively little antifreeze component, usually monoethylene glycol or else monopropylene glycol.

The purpose of this superconcentrate is always later dilution with an antifreeze component to produce the coolant concentrate and, subsequently, production of the actual coolant therefrom. The use of the undiluted superconcentrates as coolant is not intended.

Monoethylene glycol boils at 197° C. at standard pressure and monoethylene glycol-containing compositions therefore have a significant vapor pressure at temperatures above about 170° C., thus limiting their use as heat-transfer liquids at high temperatures. The same applies to monoethylene glycol monomethyl ether (boiling point at standard pressure 124° C.) and monopropylene glycol (boiling point at standard pressure 188° C.).

Glycerol as a constituent of antifreeze liquids has a relatively high boiling point of about 290° C. but decomposes at said temperature. Glycerol accordingly has a propensity for decomposition reactions at high temperatures and is therefore less suitable as a heat-transfer liquid under such conditions.

Thus, water and the lower alkylene glycols often employed in antifreeze liquids, particularly monoalkylene glycols, and their ethers and also glycerol have serious disadvantages for use as a heat-transfer liquid at high temperatures.

If heat is to be transferred at a relatively high temperature the cooling system must either be configured for higher pressures or recourse must be made to oils, for example mineral oils, synthetic oils or fatty acid esters, or fluorinated hydrocarbons as coolants. The former is technically complex and cooling systems are therefore typically open to the environment. The latter inter alia have the disadvantages that they exhibit a low heat capacity and upon penetration of water as a result of the open nature of the cooling system form two phases due to their low compatibility with water.

SUMMARY OF THE INVENTION

The present invention accordingly has for its object to provide coolants for use in batteries or fuel cells in electric vehicles and/or in hybrid vehicles composed of electric vehicles having fuel cells and/or batteries with internal combustion engines which are employable at relatively high temperatures and exhibit a high heat capacity but are also suitable for use in open cooling systems and exhibit compatibility with water.

They should further exhibit a low conductivity and also retain this in operation, thus especially necessitating low corrosion since corrosion entails introduction of ions into the coolant which would increase electrical conductivity The object was achieved by ready-to-use antifreezes for cooling systems comprising (A) at least one alkylene glycol derivative of formula (I)

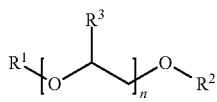

where $R^1$ is hydrogen or $C_1$- to $C_4$-alkyl, preferably hydrogen, methyl or ethyl, particularly preferably hydrogen or methyl and very particularly preferably hydrogen, $R^2$ is $C_1$- to $C_4$-alkyl, preferably methyl, ethyl or n-butyl, particularly preferably methyl or n-butyl and very particularly preferably methyl, $R^3$ is hydrogen or methyl, preferably hydrogen, and n is on arithmetic average a number from 3.0 to 4.0 and (B) at least one corrosion inhibitor selected from the group consisting of (Ba) orthosilicate esters and/or alkoxyalkylsilanes (Bb) azole derivatives (Bc) compounds of general formula (II)

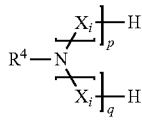

where $R^4$ is an organic radical having 6 to 10 carbon atoms, in particular a straight-chain or branched, preferably straight-chain, alkyl or alkenyl radical having 6 to 10 carbon atoms, preferably 7 to 9 and particularly preferably 8 carbon atoms, p and q are independently of one another a positive integer from 1 to 30, preferably 1 to 20, particularly preferably 1 to 10, very particularly preferably 1 to 5 and in particular 1 to 3, especially 1 or 2, and each $X_i$ for i=1 to p and 1 to q are independently of one another selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CH($C_2H_5$)—O—, —CH($C_2H_5$)—$CH_2$—O—, —CH($CH_3$)—CH($CH_3$)—O—, —$CH_2$—$CH_2$—$CH_2$—O— and —$CH_2$—$CH_2$—$CH_2$—$CH_2$—O—, preferably selected from the group consisting of —$CH_2$—$CH_2$—O—, —$CH_2$—CH($CH_3$)—O— and —CH($CH_3$)—$CH_2$—O—, particularly preferably are —$CH_2$—$CH_2$—O—, with the proviso that the composition comprises less than 1 wt % of water, preferably less than 0.75, particularly preferably less than 0.5, very particularly preferably less than 0.4, in particular less than 0.3 and especially less than 0.2 wt %, comprises a proportion of alkylene glycol derivatives of formula (I) where n≤2 of not more than 10 wt %, preferably not more than 8, particularly preferably not more than 6, very particularly preferably not more than 5, in particular not more than 4 and especially not more than 3 wt %, comprises a proportion of alkylene glycol derivatives of formula (I) where n≥5 of not more than 5 wt %, preferably not more than 4, particularly preferably not more than 3, very particularly preferably not more than 2.5 and especially not more than 2 wt %, comprises a proportion of monoethylene glycol, diethylene glycol, monopropylene glycol, dipropylene glycol, 1,3-propylene glycol and glycerol of in each case not more than 10 wt %, preferably not more than 8, particularly preferably not more than 6, very particularly preferably not more than 5 and especially not more than 3 wt %.

DETAILED DESCRIPTION OF THE INVENTION

The individual components are more particularly described hereinbelow:

Component (A)

In the at least one alkylene glycol derivative of formula (I)

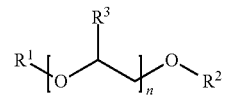

$R^1$ is hydrogen or $C_1$- to $C_4$-alkyl, preferably hydrogen, methyl or ethyl, particularly preferably hydrogen or methyl and very particularly preferably hydrogen, $R^2$ is $C_1$- to $C_4$-alkyl, preferably methyl, ethyl or n-butyl, particularly preferably methyl or n-butyl and very particularly preferably methyl, $R^3$ is hydrogen or methyl, preferably hydrogen, and n is on arithmetic average a number from 3.0 to 4.0.

Preferred alkylene glycol derivatives (A) are

Triethylene glycol monomethyl ether
Triethylene glycol monoethyl ether
Triethylene glycol mono-n-butyl ether
Triethylene glycol dimethyl ether
Triethylene glycol diethyl ether
Triethylene glycol di-n-butyl ether
Tetraethylene glycol monomethyl ether
Tetraethylene glycol monoethyl ether
Tetraethylene glycol mono-n-butyl ether
Tetraethylene glycol dimethyl ether
Tetraethylene glycol diethyl ether
Tetraethylene glycol di-n-butyl ether
Tripropylene glycol monomethyl ether
Tripropylene glycol monoethyl ether
Tripropylene glycol mono-n-butyl ether
Tripropylene glycol dimethyl ether
Tripropylene glycol diethyl ether
Tripropylene glycol di-n-butyl ether
Tetrapropylene glycol monomethyl ether
Tetrapropylene glycol monoethyl ether Tetrapropylene glycol mono-n-butyl ether
Tetrapropylene glycol dimethyl ether
Tetrapropylene glycol diethyl ether
Tetrapropylene glycol di-n-butyl ether The ethylene glycol ethers are preferred over the propylene glycol ethers.

Furthermore, the monoalkyl ethers are preferred over the dialkyl ethers.

It is preferable when component (A) is a substantially pure compound of formula (I) where n=3 or a mixture of compounds of formula (I) where n=3 and n=4. For the compounds of formula (I) in the mixture n is on arithmetic average preferably from 3.0 to 3.6, particularly preferably from 3.0 to 3.5, very particularly preferably from 3.05 to 3.4, in particular from 3.1 to 3.3 and especially from 3.15 to 3.25.

For the compounds in the mixture the radicals $R^1$ and $R^2$ may be identical or different, preferably identical.

"Substantially pure" is to be understood as meaning that for compounds of formula (I) where n=3 or n=4 homologous compounds having higher and lower values for n are likewise present to a certain extent.

The purity of compounds of formula (I) where n=3 is generally at least 80 wt %, preferably at least 85 wt %, very particularly preferably at least 90 wt %, in particular at least 95 wt % and especially 97.5 wt %. The remainder is predominantly made up of compounds of formula (I) where n=2 and n=4.

By contrast, in the case of compounds of formula (I) where n=4 the purity is only at least above 50 wt %, preferably at least 55, particularly preferably at least 60 wt %. The remainder is preferably made up of compounds of formula (I) where n=3 and, to a lesser extent, n=5.

Preferred components (A) comprising substantially pure compounds are
Triethylene glycol monomethyl ether
Triethylene glycol monoethyl ether
Triethylene glycol mono-n-butyl ether Preferred components (A) comprising mixtures of compounds of formula (I) where n=3 and n=4 are
Triethylene glycol monomethyl ether in admixture with tetraethylene glycol monomethyl ether
Triethylene glycol monoethyl ether in admixture with tetraethylene glycol monoethyl ether
Triethylene glycol mono-n-butyl ether in admixture with tetraethylene glycol mono-n-butyl ether Also conceivable, albeit less preferred, are mixtures of compounds of formula (I) where n=3 and n=4 having different radicals $R^1$.

Such mixtures are
Triethylene glycol monomethyl ether in admixture with tetraethylene glycol monoethyl ether
Triethylene glycol monomethyl ether in admixture with tetraethylene glycol mono-n-butyl ether
Triethylene glycol monoethyl ether in admixture with tetraethylene glycol monomethyl ether
Triethylene glycol monoethyl ether in admixture with tetraethylene glycol mono-n-butyl ether
Triethylene glycol mono-n-butyl ether in admixture with tetraethylene glycol monomethyl ether
Triethylene glycol mono-n-butyl ether in admixture with tetraethylene glycol monoethyl ether Also conceivable, albeit less preferred, are mixed alkylene glycol derivatives of formula (I) where for each n $R^3$ may independently of one another be identical or different, i.e. tri- and tetraalkylene glycol derivatives of formula (I) from mixtures of ethylene oxide and propylene oxide.

In the case of mixtures of compounds of formula (I) where n=3 and n=4 the weight ratio is preferably 100:0 to 40:60, particularly preferably 95:5 to 50:50, very particularly preferably 90:10 to 60:40, in particular from 85:15 to 70:30 and especially 85:15 to 75:25.

Component (B)

Component (B) is at least one corrosion inhibitor selected from the group consisting of
(Ba) orthosilicate esters and/or alkoxyalkylsilanes
(Bb) azole derivatives and
(Bc) compounds of general formula (II)

$$R^4-N\begin{matrix}[X_i]_p-H\\ [X_i]_q-H\end{matrix}$$

The orthosilicate esters (Ba) are compounds of formula $$Si(OR^5)_4$$

where
$R^5$ is in each case an organic radical having 1 to 6 carbon atoms, preferably a straight-chain or branched, preferably straight-chain, alkyl radical having 1 to 6 carbon atoms or an aryl radical having 6 carbon atoms, particularly preferably an alkyl radical having 1 to 4 carbon atoms, very particularly preferably an alkyl radical having 1 or 2 carbon atoms.

Examples include
Tetramethyl orthosilicate
Tetraethyl orthosilicate
Tetra-n-butyl orthosilicate
Tetraphenyl orthosilicate
Preference is given to
Tetramethyl orthosilicate
Tetraethyl orthosilicate
Particular preference is given to
Tetraethyl orthosilicate.

The alkoxyalkylsilanes less preferred than the orthosilicate esters are preferably triethoxymethylsilane, diethoxydimethylsilane, ethoxytrimethylsilane, trimethoxymethylsilane, dimethoxydimethylsilane and methoxytrimethylsilane.

In the context of the present specification azole derivatives (Bb) are five-membered heterocyclic compounds having 2 or 3 heteroatoms from the group of nitrogen and sulfur which comprise no sulfur atoms or at most one sulfur atom incorporated in the ring and which may optionally bear an aromatic or saturated six-membered anellation.

These five-membered heterocyclic compounds (azole derivatives) typically comprise as heteroatoms two N atoms and no S atom, 3 N Atoms and no S atom or one N atom and one S atom.

Preferred groups of the recited azole derivatives are anellated imidazoles and anellated 1, 2, 3-triazoles of general formula (III)

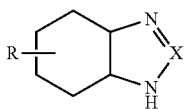

(IV)

in which the variable

R is hydrogen or a $C_1$- to $C_{10}$-alkyl radical, in particular methyl or ethyl, and the variable X is a nitrogen atom or the C—H moiety.

Typical and preferred examples of azole derivatives of general formula (III) are benzimidazole (X=C—H, R=H), benzotriazole (X=N, R=H) and tolyltriazole (X=N, R=$CH_3$). A typical example of an azole derivative of general formula (IV) is hydrogenated 1,2,3-tolyltriazole (X=N, R=$CH_3$).

A further preferred group of the recited azole derivatives are benzothiazoles of general formula (V)

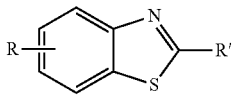

(V)

in which the variable R is as defined above and the variable R' is hydrogen, a $C_1$- to $C_{10}$-alkyl radical, in particular methyl or ethyl, or in particular a mercapto group (—SH). Conceivably, albeit less preferably, R' may also be a carboxyl radical of formula —$(C_mH_{2m})$—COOR'', wherein m is a number from 1 to 4 and R'' is $C_1$- to $C_{10}$-alkyl, in particular methyl or ethyl, or $C_6$-bis $C_{12}$-aryl. Examples include 2-benzothiazylthio acetate or 3-(2-benzothiazylthio) propionate. A typical example of an azole derivative of general formula (V) is 2-mercaptobenzthiazole.

Also preferred are non-annelated azole derivatives of general formula (VI)

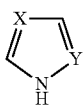

(VI)

in which the variables

X and Y are together two nitrogen atoms or a nitrogen atom and a C—H moiety, for example 1H-1,2,4-triazole (X=Y=N) or preferably imidazole (X=N, Y=C—H).

Very particularly preferred as azole derivatives for the present invention are benzimidazole, benzotriazole, tolyltriazole, hydrogenated tolyltriazole or mixtures thereof, in particular benzotriazole or tolyltriazole, especially tolyltriazole.

The recited azole derivatives are commercially available or are producible by commonly used methods. Hydrogenated benzotriazoles such as hydrogenated tolyltriazole are likewise obtainable according to DE-A 1948 794 and also commercially available.

In general formula (II) of component (Bc)

$R^4$ is an organic radical having 6 to 10 carbon atoms, in particular a straight-chain or branched, preferably straight-chain, alkyl or alkenyl radical having 6 to 10 carbon atoms, preferably 7 to 9 and particularly preferably 8 carbon atoms, p and q are independently of one another a positive integer from 1 to 30, preferably 1 to 20, particularly preferably 1 to 10, very particularly preferably 1 to 5, in particular 1 to 3, especially 1 or 2, and each $X_i$ for i=1 to p and 1 to q are independently of one another selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2$—O—, preferably selected from the group consisting of —$CH_2$—$CH_2$—O—, —$CH_2$—$CH(CH_3)$—O— and —$CH(CH_3)$—$CH_2$—O—, particularly preferably are —$CH_2$—$CH_2$—O—.

In the compounds of formula (II) the structural element $R^4$—N< is preferably derived from fatty amines which are preferably obtainable by hydrogenation and amination of fatty acids and esters, particularly preferably by hydrogenation and amination of the abovementioned fatty acids or amination of fatty alcohols.

Alkyl radicals are preferred over alkenyl radicals as radicals $R^4$.

In one specific embodiment p and q are each independently 1, 2 or 3, particularly preferably 1 or 2 and very particularly preferably 1.

In a preferred embodiment the fatty amines are n-hexylamine, 2-methylpentylamine, n-heptylamine, 2-heptylamine, iso-heptylamine, 1-methylhexylamine, n-octylamine, 2-ethylhexylamine, 2-aminooctane, 6-methyl-2-heptylamine, n-nonylamine, iso-nonylamine, n-decylamine and 2-propylheptylamine or mixtures thereof.

N-Hexylamine, n-octylamine, 2-ethylhexylamine and n-decylamine are particularly preferred and n-octylamine and 2-ethylhexylamine, and in particular n-octylamine, are very particularly preferred.

Especially worthy of mention are of di-, tri-, tetra-, penta- and hexa-ethoxylated n-octylamine and mixtures thereof and di-, tri-, tetra-, penta- and hexa-ethoxylated n-hexlamine and mixtures thereof.

In the alkoxylated amines of general formula (II) the degree of alkoxylation relates to the sum of (p+q), i.e. to the average total number of alkoxylation units per molecule of amine.

The compounds (II) are preferably obtainable by reacting the corresponding amines $R^4$—$NH_2$ with alkylene oxides up to the desired average statistical degree of alkoxylation, preferably under basic conditions. This is particularly preferred when the structural unit $X_i$ is derived from ethylene oxide or propylene oxide, preferably from ethylene oxide.

The compositions according to the invention generally comprise

Component (A): 95 to 99.9 wt %, preferably 96 to 99.8, particularly preferably 97 to 99.5, very particularly preferably 97.5 to 99 wt % and in particular 98 to 99 wt %.

Component (B): 0.1 to 5 wt %, preferably 0.2 to 4, particularly preferably 0.5 to 3, very particularly preferably 1 to 2.5 wt % and especially 1 to 2 wt %.

Component (C)—Further Optional Corrosion Inhibitors

In addition to at least one of the above components (B) as an obligatory corrosion inhibitor the composition according to the invention may optionally also comprise at least one further corrosion inhibitor distinct from those specified under (B).

However, in a preferred embodiment of the present invention the composition comprises no further corrosion inhibitors (C) in addition to the abovementioned components (B).

Examples of components (C) are aliphatic, cycloaliphatic or aromatic amines having 2 to 15 carbon atoms which may additionally comprise ether oxygen atoms or hydroxyl groups and which are distinct from the compounds (Bc) of formula (II).

The amines (C) preferably comprise 2 to 9, in particular 4 to 8, carbon atoms. The amines (C) are preferably tertiary amines. The amines (C) preferably comprise 0 to 3 ether oxygen atoms or 0 to 3, preferably 0 to 2, hydroxyl groups. Typical examples of the amines (C) are ethylamine, propylamine, iso-propylamine, n-butylamine, iso-butyl amine, sec-butylamine, tert-butylamine, n-pentylamine, n-hexylamine, n-heptylamine, n-octylamine, 2-ethylhexylamine, n-nonylamine, iso-nonylamine, di-n-propylamine, diisopropylamine, di-n-butylamine, mono-, di- and triethanolamine, mono-, di- and triisopropanolamine, piperidine, morpholine, cyclohexylamine, aniline and benzylamine. Aliphatic and cycloaliphatic amines (C) are generally saturated.

Likewise conceivable is the use of fatty acid alkoxylates and fatty alcohol alkoxylates as further corrosion inhibitors such as are described in WO 18/95759 as compounds of formula (V) and (VI) on page 5, line 34 to page 10, line 10 as hereby incorporated by reference.

Component (C) is optional and may be present in the compositions according to the invention in amounts of 0 to 2 wt %, preferably 0 to 1.5 wt %, particularly preferably 0 to 1 wt %, very particularly preferably 0 to 0.7 wt %.

In an expressly preferred embodiment no component (C) is present.

Component (D)—Further Additives

The composition according to the invention may optionally also comprise at least one further additive selected from the group consisting of
- (Da) bitterants
- (Db) dyes
- (Dc) defoamers
- (Dd) antioxidants and
- (De) emulsifiers.

Bitterants (Da) may be added for reasons of hygiene and safety in case of swallowing, for example bitterants of the denatonium benzoate type. Bitterants are optional in the compositions according to the present application. It is preferable when no bitterant is present in the composition according to the invention.

These substances are commercially available and customary compounds from the prior art which are typically employed in coolants.

One function of the employed emulsifiers (De) in the compositions according to the invention is that they can emulsify any contaminants and/or assembly fluids originating from the cooling system, for example polyalkylene glycols or oligomers of glycerol, in the composition.

Components (D) are in each case optional and may each independently of one another be present in the compositions according to the invention in amounts of 0 to 0.5 wt %, preferably 0.001 to 0.3 wt % and particularly preferably 0.002 to 0.2 wt %.

Properties of the Compositions According to the Invention

The compositions according to the invention are subject to the following provisos:

They comprise less than 1 wt % of water, preferably less than 0.75, particularly preferably less than 0.5, very particularly preferably less than 0.4, in particular less than 0.3 and especially less than 0.2 wt %.

The low water content according to the invention in conjunction with the choice of component (A) brings about the elevated boiling point according to the invention since a higher water content limits the boiling point of a composition to about 100° C. plus any boiling point elevation. The presence of even small amounts of water drastically lowers the boiling point of the compositions; this effect is known for example from brake fluids and results in different demands on the boiling points depending on the water content.

When using the composition as coolant for cooling systems in fuel cells, batteries and/or rechargeable batteries, water, having significant electrical conductivity, can moreover result in electrolysis of the composition and undesired hydrogen evolution which entails an elevated risk of accidents.

The compositions according to the invention are subject to the further proviso that they have a proportion of alkylene glycol derivatives of formula (I) where n ≤ 2 of not more than 10 wt %, preferably not more than 8, particularly preferably not more than 6, very particularly preferably not more than 5, in particular not more than 4 and especially not more than 3 wt %.

A higher content of alkylene glycol derivatives of formula (I) where n≤2 would likewise result in an unwanted lowering of the boiling point and would also result in excessive reduction of the viscosity of the composition. An excessively low viscosity may be undesired in certain applications since low-viscosity liquids easily defeat seals and thus cause leaks.

The compositions according to the invention are subject to the further proviso that they have a proportion of alkylene glycol derivatives of formula (I) where n≥5 of not more than 5 wt %, preferably not more than 4, particularly preferably not more than 3, very particularly preferably not more than 2.5 and especially not more than 2 wt %.

It is conversely true that higher homologs bring about a high viscosity of the composition and thus impede the pumpability of the composition. A high viscosity entails elevated pump power output and thus elevated energy consumption of the pumps. The higher homologues additionally have an elevated melting point, so that at low temperatures there is a risk they may precipitate out of the composition.

The compositions according to the invention are subject to the further proviso that they comprise a proportion of monoethylene glycol, diethylene glycol, monopropylene glycol, dipropylene glycol, 1,3-propylene glycol and glycerol of in each case not more than 10 wt %, preferably not more than 8, particularly preferably not more than 6, very particularly preferably not more than 5 and especially not more than 3 wt %.

In addition to the abovementioned low boiling point of the lower homologues polyhydric alcohols are relatively unstable to thermal stress and oxidation. A small proportion of the recited compounds therefore increases the stability of the compositions according to the invention.

The compositions according to the invention preferably have a specific heat capacity at 50° C. of at least 2.0 kJ/kg×K, particularly preferably of at least 2.1, very particularly preferably at least 2.2 and in particular of at least 2.3 kJ/kg×K.

The compositions according to the invention preferably have a thermal conductivity of at least 0.15 W/m×K.

In order to obtain a low thermal conductivity components (A) employed are preferably compounds having a polarizability of not more than 50 C×m$^2$/V, particularly preferably not more than 45, very particularly preferably not more than 40, in particular not more than 35 and especially not more than 30.

Use

It is an advantage of the described compositions that they are generally employable as coolants for cooling systems, in particular as cooling systems in fuel cells, batteries and/or rechargeable batteries. These coolants further exhibit antifreeze activity.

For the latter use it is crucial that the compositions have an electrical conductivity at 25° C. of at most 50 µS/cm, preferably not more than 25, particularly preferably not more than 15, very particularly preferably not more than 10 and in particular not more than 5 µS/cm.

A low electrical conductivity in cooling systems in fuel cells, batteries and rechargeable batteries is essential since otherwise the individual cells may short circuit in operation, upon discharging or upon charging.

Any damage to the battery cell entails a risk of coolant and electrolyte coming into contact and forming dangerous hydrogen fluoride and other reaction products through reaction of the protic coolant with the often employed electrolyte LiPF$_6$. This risk is further increased by the presence of water, for example as a result of the hygroscopic nature of the coolant (see below). For instance it is known for example from A. V. Plakhotnyk et al., Journal of Fluorine Chemistry, 126 (2005) 27-31 that in the case of LiPF$_6$ dissolved in aprotic organic solvents even at a water content of only 0.5 wt % a total of about 10 mol % of the employed LiPF$_6$ is hydrolyzed over about 23 days.

Surprisingly, no significant reaction was observable upon contacting the compositions according to the invention with LiPF$_6$, even in the presence of water. The compositions according to the invention are therefore particularly suitable for cooling lithium-ion rechargeable batteries.

In accordance with general usage the terms "battery" and "rechargeable battery" are used here in such a way that rechargeable batteries are to be understood as rechargeable individual or interconnected storage means for chemical energy and "battery" is used as an umbrella term for rechargeable and nonrechargeable storage means. The term "rechargeable battery" is thus a subset of "battery".

In order to achieve the low electrical conductivity required according to the invention it is preferable to eschew compounds in salt form and easily dissociating compounds, particularly acids, when selecting the employed components. A preferred embodiment therefore comprises employing the further additives described above in a form which is substantially nonionic under the usage conditions.

Since glycol ether is generally hygroscopic there is a risk of the water content in the composition according to the invention increasing over time during storage, particularly in the case of open storage, or else upon use in the cooling system, for example by absorption of atmospheric humidity. This also applies to storage and use in sealed systems since many seals are permeable to air and moisture.

It is an advantage of the compositions according to the invention that even upon absorption/addition of water in up to 5, preferably up to 10, particularly preferably up to 25 wt %, very particularly preferably up to 40 and in particular up to 50 wt % based on the total mixture said compositions have an electrical conductivity at 25° C. of not more than 50 µS/cm, preferably not more than 25, particularly preferably not more than 15 µS/cm and very particularly preferably not more than 10 µS/cm.

It is a further advantage of the compositions according to the invention that they are compatible with the most important typically employed sealing materials. This applies for example to EPDM (ethylene-propylene-diene (monomer) rubbers, preferably according to EN 13956), SBR (styrene-butadiene rubbers), FKM (fluorocarbon rubbers, preferably according to DIN ISO 1629 or ASTM D 1418, for example Viton®), NBR (acrylonitrile butadiene rubbers) and HNBR (hydrogenated acrylonitrile butadiene rubbers).

It is an advantage of the compositions according to the invention that on account of its stability to thermal stress and oxidation an initially low electrical conductivity is retained even in the longer term since the formation of electrically conductive products as a result of decomposition or oxidation is reduced.

In a particularly preferred embodiment of the present invention the compositions according to the invention are therefore diluted with up to 40 and even up to 50 wt % of deionized, preferably demineralized or double-distilled, water based on the total aqueous mixture and employed in this form as coolants and antifreezes for fuel cells, since even these aqueous coolants and antifreezes have a sufficiently low conductivity for this specific application.

"Ion-free water" is to be understood as meaning water which has a neutral pH and which comprises substantially no ions other than hydroxide and oxonium ions from the autoprotolysis of the water. Electrical conductivity of such water at 25° C. is preferably not more than 5 µS/cm, particularly preferably not more than 3, very particularly preferably not more than 2 and in particular not more than 1 µS/cm.

The compositions according to the invention preferably have a boiling point at 1013 hPa (standard pressure) of at least 200° C., preferably at least 210° C., particularly preferably at least 220° C., very particularly preferably at least 230° C. and in particular at least 250° C.

This ensures that the compositions remain liquid even at high ambient temperatures and can function as heat-transfer media without the vapor pressure over the compositions increasing excessively. The compositions according to the invention may therefore be employed in open systems even at high temperatures.

As specified hereinabove the compositions according to the invention have an advantageous viscosity which is not too low and not too high.

They preferably have a kinematic viscosity at 100° C. according to ASTM D445 of at most 4 mm$^2$/s, particularly preferably of at most 3 and very particularly preferably of at most 2 mm$^2$/s.

They moreover preferably have a kinematic viscosity at minus 40° C. according to ASTM D445 of not more than 600 mm$^2$/s, particularly preferably of not more than 500, very particularly preferably of not more than 400 and in particular of not more than 350 mm$^2$/s.

It is an advantage of the compositions according to the invention that over a wide temperature range, preferably from minus 40° C. to plus 100° C., they exhibit not only a lower viscosity but also a smaller change in viscosity than conventional coolants based on water and monoethylene glycol:

For instance a mixture of 50 wt % water and 50 wt % monoethylene glycol already solidifies at about minus 37° C. and is thus not employable in the abovementioned preferred temperature range. The kinematic viscosity of such a mixture is about 300 mm²/s at minus 20° C.

It is an advantage of the present invention that typical mixtures according to the present invention are not solid at minus 40° C. and have a kinematic viscosity at minus 40° C. of about 250 to 500 mm²/s and at minus 20° C. of not more than about 100 mm²/s.

Accordingly, for the compositions according to the invention the change in kinematic viscosity in the temperature range from minus 40° C. to plus 100° C. is not more than about 500 mm²/s and thus varies to a lesser extent than the abovementioned mixture of water and monoethylene glycol. This has the result that the cooling system may employ pumps having a lower conveying power output, so that less energy is required for conveying the coolant in the cooling system.

Process

As a result of the described compositions having a higher boiling point than the conventional coolants based on water/monoalkylene glycol the present invention further provides a method for cooling rechargeable batteries, fuel cells and batteries of vehicles in which heat from a heat source at a relatively high temperature is transferred to a coolant via at least one first heat exchanger, this coolant is passed in a cooling circuit to at least one second heat exchanger and in said second heat exchanger heat is removed from the coolant at a relatively low temperature, wherein
- a composition as described hereinabove is employed as the coolant,
- the relatively high temperature is from 60° C. to 300° C., preferably 70° C. to 280° C., particularly preferably 80° C. to 250° C.,
- the relatively low temperature is from minus 50° C. to 100° C., preferably minus 40° C. to 90° C., particularly preferably minus 30° C. to 80° C. and
- the relatively low temperature is at least 50° C. lower than the relatively high temperature.

In a preferred embodiment the pressure in the cooling circuit is not more than 500 hPa, preferably not more than 400, particularly preferably not more than 300 and very particularly preferably not more than 200 hPa above atmospheric pressure when using the compositions according to the invention with their high boiling point.

The relatively high temperature is for example selected from the wall temperatures of rechargeable batteries, fuel cells or batteries during customary operation of electric vehicles having fuel cells and/or batteries and/or hybrid vehicles composed of electric vehicles having fuel cells and/or batteries with internal combustion engines or during charging or discharging of such batteries or rechargeable batteries.

The relatively low temperature is preferably the ambient temperature with which the heated coolant is brought into contact in the second heat exchanger.

All of the heat exchangers may be components known per se which are known to those skilled in the art for these purposes.

Amounts reported in percent, ppm or parts in this specification relate to wt %, ppmw or parts by weight unless otherwise stated.

EXAMPLES

Test Methods:

Unless otherwise stated the values reported in this specification were determined using the following methods:

| | |
|---|---|
| Boiling point | ASTM D 1120 |
| Density | ASTM D 1122 |
| Electrical conductivity | ASTM D 1125 |
| Specific heat capacity | DIN EN ISO 11357-4 |
| Thermal conductivity | sphere gap method |
| Water content | ASTM D 1123 |
| Flash point | ISO 2719 |
| Ignition temperature | DIN 51794 |
| Refractive index | ASTM D 1218 |
| Reserve alkalinity | ASTM D 1121 |
| pH | ASTM D 1287 |

Compositions

The following compositions were prepared (reported in wt %):

Comparison:

| No. | 1 | 2 | 3 | 4 | 5 |
|---|---|---|---|---|---|
| Triethylene glycol monomethyl ether | 95.50 | 88.50 | 81.50 | 74.50 | 67.50 |
| Tetraethylene glycol monomethyl ether | 4.50 | 11.50 | 18.50 | 25.50 | 32.50 |
| Sum | 100.00 | 100.00 | 100.00 | 100.00 | 100.00 |
| Kinematic viscosity, −40° C., mm²/s (ASTM D 445) | 254.3 | 298.9 | 319.8 | 360 | 393.6 |
| Kinematic viscosity, −20° C., mm²/s (ASTM D 445) | 47.7 | 53.5 | 56.6 | 61.4 | 65.8 |
| Kinematic viscosity, 100° C., mm²/s (ASTM D 445) | 1.3919 | 1.4208 | 1.4658 | 1.5099 | 1.5621 |

| No. | 6 | 7 | 8 | 9 | 10 |
|---|---|---|---|---|---|
| Triethylene glycol monomethyl ether | 93.60 | 86.60 | 79.90 | 72.60 | 65.60 |
| Tetraethylene glycol monomethyl ether | 2.60 | 9.60 | 16.60 | 23.60 | 30.60 |

-continued

|  |  |  |  |  |  |
|---|---|---|---|---|---|
| Additive mixture* | 2.00 | 2.00 | 2.00 | 2.00 | 2.00 |
| Diisopropanolamine | 1.00 | 1.00 | 1.00 | 1.00 | 1.00 |
| Octyldiethanolamine | 0.80 | 0.80 | 0.80 | 0.80 | 0.80 |
| Sum | 100.00 | 100.00 | 100.00 | 100.00 | 100.00 |
| Kinematic viscosity, −40° C., mm²/s (ASTM D 445) | 284.4 | 315.3 | 349.9 | 389.2 | 477.6 |
| Kinematic viscosity, −20° C., mm²/s (ASTM D 445) | 52.0 | 56.3 | 60.5 | 65.4 | 70.4 |
| Kinematic viscosity, 100° C., mm²/s (ASTM D 445) | 1.4934 | 1.8668 | 1.8067 | 1.6869 | 1.6973 |

| No. | 11 | 12 | 13 |
|---|---|---|---|
| Triethylene glycol monomethyl ether | 92.20 | 89.20 | 82.20 |
| Tetraethylene glycol monomethyl ether | 4.00 | 7.00 | 14.00 |
| Additive mixture* | 2.00 | 2.00 | 2.00 |
| Diisopropanolamine | 0 | 0 | 0 |
| Octyldiethanolamine | 1.8 | 1.8 | 1.8 |
| Sum | 100.00 | 100.00 | 100.00 |
| Kinematic viscosity, −40° C., mm²/s (ASTM D 445) | 262.4 | 273.91 | 306.27 |
| Kinematic viscosity, −20° C., mm²/s (ASTM D 445) | 49.2 | 50.861 | 55.128 |
| Kinematic viscosity, 100° C., mm²/s (ASTM D 445) | 1.4224 | 1.4458 | 1.4895 |

*The employed 2 parts of additive mixture are composed of the nonferrous metal corrosion inhibitor tolyltriazole, antioxidant and a fatty alcohol ethoxylates corrosion inhibitor dissolved in 1.67 parts of triethylene glycol monomethyl ether.

The corrosion test afforded the following values for reserve alkalinity before/after corrosion (measured in ml of 0.1 M HCl/10 ml of test volume), pH before/after corrosion and corrosive erosion in mg/cm² over 336 h according to ASTM D1384:

| No. | 1 (comp) | 2 (comp) | 3 (comp) | 4 (comp) | 5 (comp) |
|---|---|---|---|---|---|
| Reserve alkalinity before corrosion | 0 | 0 | 0 | 0 | 0 |
| Reserve alkalinity after corrosion | 0 | 0 | 0 | 0 | 0 |
| pH before corrosion | 5.84 | 6.04 | 6.18 | 6.1 | 6.08 |
| pH after corrosion | 2.58 | 2.67 | 2.68 | 3.07 | 3.3 |
| Al | 0.05 | 0.04 | 0.22 | 0.31 | 0.38 |
| Cu | −0.16 | −0.26 | −0.28 | −0.3 | −0.18 |
| Brass | −0.17 | −0.3 | −0.23 | −0.29 | −0.19 |
| Steel | −3.66 | −3.25 | −2.27 | −1.45 | −0.99 |
| Gray iron | −2.54 | −2.51 | −2.17 | −1.69 | −1.24 |
| Soft solder | −1.87 | −1.36 | −1.38 | −0.94 | −1.02 |

| No. | 6 | 7 | 8 | 9 | 10 |
|---|---|---|---|---|---|
| Reserve alkalinity before corrosion | 10.8 | 10.78 | 10.82 | 10.85 | 10.75 |
| Reserve alkalinity after corrosion | 8.63 | 8.56 | 8.91 | 8.79 | 8.77 |
| pH before corrosion | 9.5 | 9.6 | 9.7 | 9.8 | 9.9 |
| pH after corrosion | 9.9 | 9.3 | 9.9 | 9.9 | 10.0 |
| Al | 0.04 | 0.1 | 0.06 | 0.06 | 0.05 |
| Cu | −0.43 | −0.41 | −0.42 | −0.43 | −0.44 |
| Brass | 0.07 | 0.07 | 0.07 | 0.08 | 0.08 |
| Steel | 0.04 | 0.03 | 0.03 | 0.02 | 0.04 |
| Gray iron | 0.09 | 0.11 | 0.11 | 0.07 | 0.14 |
| Soft solder | −0.07 | −0.06 | −0.06 | −0.05 | −0.05 |

| No. | 11 | 12 | 13 |
|---|---|---|---|
| Reserve alkalinity before corrosion | 7.76 | 7.98 | 8.03 |
| Reserve alkalinity after corrosion | 6.76 | 6.25 | 6.42 |
| pH before corrosion | 9.4 | 9.64 | 9.68 |
| pH after corrosion | 9.4 | 9.45 | 9.47 |
| Al | 0.05 | 0.05 | 0.1 |
| Cu | −0.03 | −0.02 | −0.02 |
| Brass | 0.06 | 0.06 | 0.07 |
| Steel | 0.02 | 0.03 | 0.03 |
| Gray iron | 0.13 | 0.1 | 0.08 |
| Soft solder | −0.17 | −0.18 | −0.14 |

In the supernatant liquid from the corrosion test according to ASTM D1384 the following contents of metals were determined by ICP spectrometry (inductively coupled plasma) [ppm]:

| No. | 1 (comp) | 2 (comp) | 3 (comp) | 4 (comp) | 5 (comp) |
|---|---|---|---|---|---|
| Fe | 18 | 16 | 8 | 28 | 31 |
| Cu | 9 | 7 | 5 | 6 | 9 |
| Al | <3 | <3 | <3 | <3 | <3 |
| Zn | 5 | 3 | <3 | 3 | 4 |

-continued

| Sn | 6 | 6 | 3 | 5 | 6 |
| Pb | 13 | 7 | 8 | 5 | 8 |

| No. | 6 | 7 | 8 | 9 | 10 |
|---|---|---|---|---|---|
| Fe | <3 | <3 | <3 | <3 | <3 |
| Cu | 18 | 18 | 18 | 18 | 19 |
| Al | <3 | <3 | <3 | <3 | <3 |
| Zn | <3 | <3 | <3 | <3 | <3 |
| Sn | <3 | <3 | <3 | <3 | <3 |
| Pb | <3 | <3 | <3 | <3 | <3 |

| No. | 11 | 12 | 13 |
|---|---|---|---|
| Fe | <3 | <3 | <3 |
| Cu | 3 | <3 | 3 |
| Al | <3 | <3 | <3 |
| Zn | <3 | <3 | <3 |
| Sn | <3 | <3 | <3 |
| Pb | <3 | <3 | <3 |

It is apparent that in the compositions according to the present invention the incorporation particularly of iron ions but also of copper ions into the liquid is markedly reduced. It is thus possible to keep the electrical conductivity of the inventive compositions low. The pH is further kept stable during the corrosion and shows only a slight change.

This is apparent from the following measured electrical conductivities (at 25° C. in μS/cm) before/after corrosion:

|  | 1 (comp) | 6 | 7 | 8 | 9 | 10 | 11 | 12 | 13 |
|---|---|---|---|---|---|---|---|---|---|
| Before corrosion | 0 | 1.2 | 1.1 | 1 | 0.9 | 0.9 | 1.1 | 0.8 | 0.7 |
| After corr | 0.3 | 1.6 | 1.4 | 1.3 | 1.2 | 1.3 | 1.3 | 1.5 | 1.3 |

It is apparent that the comparative composition shows a more marked relative increase in electrical conductivity than the inventive compositions.

Corrosion test according to ASTM D1384 and corrosive erosion in mg/cm² over 4 weeks:

|  | No. | | | | | | |
|---|---|---|---|---|---|---|---|
|  | 14 | 15 | 16 | 17 | 18 | 19 | 20**** (comp.) |
| Triethylene glycol monomethyl ether | 90 | 86.2 | 86.2 | 88.2 | 89.95 | 86.2 | |
| Tetraethylene glycol monomethyl ether | 10 | 10 | 10 | 10 | 10 | 10 | |
| Octyldiethanolamine | | 1.8 | 1.8 | 1.8 | | 1.8 | |
| Additive mixture: | | | | | | | |
| Tolyltriazole* | | 0.05 | 0.05 | | 0.05 | | |
| Antioxidant** | | 0.03 | | | | 0.03 | |
| Emulsifiers*** | | 0.25 | 0.25 | | | 0.25 | |
| Triethylene glycol monomethyl ether | | 1.67 | 1.7 | | | 1.72 | |
| Defoamer | 0.001 | 0.001 | 0.001 | 0.001 | 0.001 | 0.001 | |
| Sum | 100 | 100 | 100 | 100 | 100 | 100 | |

The components employed in the additive mixture have the following activity:
*Tolyltriazole as an inhibitor against nonferrous metal corrosion
**Antioxidant for preventing/reducing oxidation of the alkylene glycol ethers
***Mixture of fatty alcohol ethoxylates
****Cooling composition based on monoethylene glycol/water (60/40 w/w) according to EP 1399523 B1, example 5, comparison.

|  | No. | | | | | | |
|---|---|---|---|---|---|---|---|
|  | 14 | 15 | 16 | 17 | 18 | 19 | 20 (comp.) |
| Erosion | mg/cm² | mg/cm² | mg/cm² | mg/cm² | mg/cm² | mg/cm² | mg/cm² |
| Cu | −0.69 | −0.17 | −0.18 | −0.80 | −0.59 | −0.30 | −0.07 |
| Soft solder | −2.58 | −0.17 | −0.21 | −0.23 | −2.23 | −0.26 | −1.70 |
| Brass | −0.83 | −0.03 | −0.05 | −0.13 | −0.77 | −0.01 | −0.13 |
| Steel | −6.11 | 0.00 | −0.01 | −0.01 | 14.39 | 0.00 | −37.65 |
| Gray iron | −5.80 | 0.07 | 0.08 | 0.09 | −3.70 | 0.12 | −48.79 |
| Al | −1.72 | 0.05 | 0.03 | 0.57 | −0.46 | 0.05 | −0.03 |

It is apparent from the above table that the N-octyldiethanolamine particularly preferred according to the invention shows particular advantages as an inhibitor of the corrosion of ferrous materials, particularly steel and gray iron.

It further exhibits an activity as a nonferrous metal corrosion inhibitor and can partially replace the conventionally employed tolyltriazole as same.

Corrosion test of composition number 15 based on ASTM D1384 with the following modifications: Distilled water was employed and made up to a 50 wt % aqueous solution and only three metals (brass, steel and aluminum) considered representative for fuel cells were employed. The results of the corrosion test were determined after 4 and 7 days.

| No. | 15 | 15 |
|---|---|---|
| days | 4 | 7 |
| Erosion | mg/cm² | mg/cm² |
| Brass | 0.01 | −0.07 |
| Steel | 0.00 | −0.01 |
| Al | 0.10 | 0.09 |

Profile of electrical conductivity at different temperatures and admixture of double-distilled water having a conductivity of 0.8 μS/cm at 25° C./1.5 μS/cm at 60° C.

| Wt % composition of Ex 15 | Wt % of water | Conductivity µS/cm at 25° C. | Conductivity µS/cm at 60 ° C. |
| --- | --- | --- | --- |
| 100 | 0 | 0.8 | 1.3 |
| 99 | 1 | 1.0 | 1.9 |
| 98 | 2 | 1.2 | 2.4 |
| 97 | 3 | 1.5 | 3.0 |
| 96 | 4 | 1.7 | 3.7 |
| 95 | 5 | 2.0 | 4.4 |
| 90 | 10 | 3.4 | 9.0 |
| 80 | 20 | 7.5 | 22.4 |
| 70 | 30 | 13.7 | 38.0 |
| 60 | 40 | 19.2 | 50.4 |
| 50 | 50 | 24.7 | 63.2 |

It is apparent that the analyzed inventive composition from example 15 remains below the critical conductivity of 25 µS/cm at 25° C. even upon 1:1 dilution with double-distilled water and remains below a critical conductivity of 10 µS/cm upon admixture of 20 wt % of double-distilled water.

The invention claimed is:

1. A ready-to-use antifreeze composition for cooling systems, comprising a component (A) and a component (B), wherein component (A) comprises at least two alkylene glycol derivatives of formula (I)

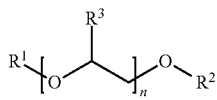

wherein
$R^1$ is hydrogen or $C_1$- to $C_4$-alkyl,
$R^2$ is $C_1$- to $C_4$-alkyl,
$R^3$ is hydrogen or methyl, and
n is on arithmetic average a number from 3.0 to 4.0; and
wherein component (B) comprises at least one corrosion inhibitor selected from the group consisting of
(Ba) an orthosilicate ester and/or an alkoxyalkylsilane,
(Bb) an azole derivative, and
(Bc) a compound of general formula (II)

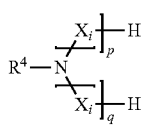

wherein
$R^4$ is an organic radical having 6 to 10 carbon atoms,
p and q are independently of one another a positive integer from 1 to 30, and
each Xi for i=1 to p and 1 to q are independently of one another selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O-and-$CH_2$—$CH_2$—$CH_2$—$CH_2$—O—; and
with the proviso that the composition comprises:
less than 1 wt % of water,
a proportion of alkylene glycol derivatives of formula (I) wherein n≤2 of not more than 10 wt %,
a proportion of alkylene glycol derivatives of formula (I) wherein n≥5 of not more than 5 wt %,
a ratio of alkylene glycol derivatives of formula (I) wherein n=3 to those wherein n=4 is from 95:5 to 40:60; and
a proportion of monoethylene glycol, diethylene glycol, monopropylene glycol, dipropylene glycol, 1,3-propylene glycol or glycerol, if present, of not more than 10 wt %.

2. The composition according to claim 1, wherein the composition has an electrical conductivity at 25° C. of at most 50 µS/cm.

3. The composition according to claim 1, wherein the composition has a boiling point at 1013 hPa of at least 200° C.

4. The composition according to claim 1, wherein the composition has a kinematic viscosity at 100° C. according to ASTM D445 of at most 4 mm²/s.

5. The composition according to claim 1, wherein the composition has a kinematic viscosity at minus 40° C. according to ASTM D445 of not more than 600 mm²/s.

6. The composition as claimed in claim 1, wherein the composition has a specific heat capacity at 50° C. of at least 2.0 KJ/kg×K.

7. The composition according to claim 1, wherein the composition has a thermal conductivity of at least 0.15 W/m×K.

8. The composition according to claim 1, wherein the at least one corrosion inhibitor comprises a compound of the general formula (II), and
wherein the structural element $R^4$—N< of the general formula (II) is derived from at least one amine selected from the group consisting of n-hexylamine, 2-methylpentylamine, n-heptylamine, 2-heptylamine, iso-heptylamine, 1-methylhexylamine, n-octylamine, 2-ethylhexylamine, 2-aminooctane, 6-methyl-2-heptylamine, n-nonylamine, iso-nonylamine, n-decylamine, 2-propylheptylamine, and mixtures thereof.

9. The composition according to claim 1, wherein the at least one corrosion inhibitor comprises an azole derivative, and
wherein the azole derivative is selected from the group consisting of benzimidazole, benzotriazole, tolyltriazole, and hydrogenated tolyltriazole.

10. The composition according to claim 1, comprising:
95 to 99.9 wt % of component (A) and
0.1 to 5 wt % of component (B).

11. The composition according to claim 1, consisting of component (A), component (B), optionally at least one further corrosion inhibitor (C) distinct from component (B) and optionally at least one further compound selected from the group consisting of a bitterant, a dye, a defoamer, and an antioxidant.

12. The composition according to claim 1, wherein the composition comprises a proportion of alkylene glycol derivatives of formula (I) wherein n≤2 of not more than 3 wt %.

13. The composition according to claim 1, wherein the composition comprises a proportion of alkylene glycol derivatives of formula (I) wherein n≥5 of not more than 2 wt %.

14. The composition according to claim 1, wherein the composition comprises a proportion of monoethylene glycol, diethylene glycol, monopropylene glycol, dipropylene glycol, 1,3-propylene glycol, or glycerol, of 0 wt % to not more than 3 wt %.

15. A coolant for lithium-ion rechargeable batteries, comprising the composition according to claim 1.

16. A method of cooling systems in fuel cells, batteries, and/or rechargeable batteries, the method comprising:
employing the composition according to claim 1 as a coolant or antifreeze for cooling systems in fuel cells, batteries and/or rechargeable batteries.

17. A method for cooling, comprising:
employing the composition according to claim 1 as a coolant,
transferring heat from a heat source at a temperature from 60° C. to 300° C. to the coolant via at least one first heat exchanger,
passing this coolant in a cooling circuit to at least one second heat exchanger, and
removing heat from the coolant at a temperature from minus 50° C. to 100° C. in said second heat exchanger,
wherein the temperature of the removal of heat from the coolant is at least 50° C. lower than the temperature of the heat source.

* * * * *